(12) United States Patent
Crawford et al.

(10) Patent No.: US 10,019,202 B2
(45) Date of Patent: Jul. 10, 2018

(54) AUTONOMIC CONFIGURATION OF STORAGE SYSTEMS FOR VIRTUALIZATION

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); David M. Sedgwick, Raleigh, NC (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/992,948

(22) Filed: Jan. 11, 2016

(65) Prior Publication Data
US 2017/0199683 A1 Jul. 13, 2017

(51) Int. Cl.
*G06F 3/06* (2006.01)
(52) U.S. Cl.
CPC ............ *G06F 3/0665* (2013.01); *G06F 3/067* (2013.01); *G06F 3/0619* (2013.01); *G06F 3/0689* (2013.01)
(58) Field of Classification Search
None
See application file for complete search history.

(56) References Cited

U.S. PATENT DOCUMENTS

| 7,631,262 | B1 * | 12/2009 | Knight | G06F 3/0605 711/170 |
| 8,346,735 | B1 * | 1/2013 | Tang | G06F 11/1474 707/675 |
| 9,015,111 | B2 * | 4/2015 | Akaike | G06F 17/30132 707/609 |
| 2008/0282243 | A1 | 11/2008 | Seguin et al. | |

(Continued)

OTHER PUBLICATIONS

Anonymous, "Method for Autonomic Efficiency optimization of virtualized storage systems," IP.com, Oct. 7, 2010, pp. 1-3.

(Continued)

*Primary Examiner* — Sean D Rossiter
*Assistant Examiner* — Charles J Choi
(74) *Attorney, Agent, or Firm* — Zilka-Kotab, P.C.

(57) ABSTRACT

Systems, methods, and computer program products for autonomously obtaining configuration information and configuring a storage system for virtualization are disclosed. Configuring virtualization of a storage system may include: creating a storage pool for each array designated by an administrator for virtualization; creating one or more volumes for each storage pool; creating or selecting a volume controller designated by the administrator for hosting virtualization; identifying one or more ports of the volume controller; and mapping the one or more volumes to the one or more ports of the volume controller. Configuration information obtained may include designation of one or more arrays available to a storage system to which virtualization should be applied; designation of either an existing volume (Continued)

controller or a new volume controller and new volume controller name; and/or a confirmation, a negation, or a modification of one or more port identifiers.

19 Claims, 5 Drawing Sheets

(56) References Cited

U.S. PATENT DOCUMENTS

| | | | | |
|---|---|---|---|---|
| 2009/0199041 A1* | 8/2009 | Fukui | ............... | G06F 11/2082 |
| | | | | 714/6.12 |
| 2009/0254636 A1* | 10/2009 | Acedo | ............... | G06F 3/0607 |
| | | | | 709/220 |
| 2009/0287898 A1* | 11/2009 | Hara | ............... | G06F 3/0607 |
| | | | | 711/170 |
| 2012/0137065 A1* | 5/2012 | Odenwald | ............ | G06F 3/0605 |
| | | | | 711/114 |
| 2012/0226861 A1* | 9/2012 | Yoshii | ............... | G06F 12/0871 |
| | | | | 711/118 |
| 2012/0297159 A1* | 11/2012 | Honda | ............... | G06F 3/0605 |
| | | | | 711/165 |
| 2015/0040122 A1 | 2/2015 | Singleton, IV et al. | | |
| 2015/0095592 A1* | 4/2015 | Okajima | ............ | G06F 3/0626 |
| | | | | 711/154 |

OTHER PUBLICATIONS

Anonymous, "Define virtual storage pool attributes based on storage volumes to be migrated," IP.com, Jan. 24, 2014, pp. 1-6.
Pooja et al., "Virtual Machine Performance Measurement," Proceedings of 2014 RAECS UIET, Mar. 6-8, 2014, 3 pages.

* cited by examiner

AUTONOMIC CONFIGURATION OF STORAGE SYSTEMS FOR VIRTUALIZATION

BACKGROUND

The present invention relates to storage system virtualization, and more specifically, this invention relates to configuring storage systems for virtualization, especially storage area network (SAN) volume controller (SVC) virtualization.

Storage system virtualization is an important aspect of modern data storage, and requires precise configuration to ensure the storage system operates efficiently. According to conventional architectures, enabling virtualization for a storage system, especially a SAN, requires an administrator to manually configure and initialize the storage system.

However, manual configuration and initialization is a complex process involving multiple steps and calculations, and administrators often omit certain steps, commit errors in the course of performing various calculations and/or make improper estimates (e.g. regarding appropriate amount of storage to assign to various pools in the SAN).

In addition, the manual configuration process is significantly cumbersome since the administrator must separately configure each individual array in the SAN, increasing the likelihood that configuration will be performed incorrectly (e.g. the administrator may skip a particular array, forget to configure a particular array, become confused as to the characteristics of a particular array being configured and thus commit errors in configuring the array, etc.).

Accordingly, it would be of significant benefit to provide systems and techniques for autonomic configuration of storage system virtualization, in order to improve the function of the storage system by ensuring appropriate configuration settings are employed.

SUMMARY

In one embodiment, a computer-implemented method for obtaining configuration information for virtualization of a storage system includes: receiving a designation of one or more arrays available to a storage system to which virtualization should be applied; receiving a designation of either an existing volume controller or a new volume controller; in response to receiving the designation of the new volume controller, receiving a designation of a name of the new volume controller; and receiving a confirmation, a negation, or a modification of one or more port identifiers, each port identifier corresponding to one of a plurality of ports on the volume controller to be utilized for virtualization.

In another embodiment, a computer-implemented method for configuring virtualization of a storage system includes: creating a storage pool for each array designated by an administrator for virtualization; creating one or more volumes for each storage pool; creating or selecting a volume controller designated by the administrator for hosting virtualization; identifying one or more ports of the volume controller; and mapping the one or more volumes to the one or more ports of the volume controller.

In yet another embodiment, a computer program product for obtaining configuration information for virtualization of a storage system includes a computer readable storage medium having program instructions embodied therewith. The computer readable storage medium is not a transitory signal per se, the program instructions executable by a computer to cause the computer to perform a method. The method includes: receiving, via the computer, a designation of one or more arrays available to a storage system to which virtualization should be applied; receiving, via the computer, a designation of either an existing volume controller or a new volume controller; in response to receiving a designation of the new volume controller, receiving a designation, via the computer, of a name of the new volume controller; and receiving, via the computer, a confirmation, a negation, or a modification of one or more port identifiers, each port identifier corresponding to one of a plurality of ports on the volume controller to be utilized for virtualization.

Other aspects and embodiments of the present invention will become apparent from the following detailed description, which, when taken in conjunction with the drawings, illustrate by way of example the principles of the invention.

DETAILED DESCRIPTION

Figure 1:
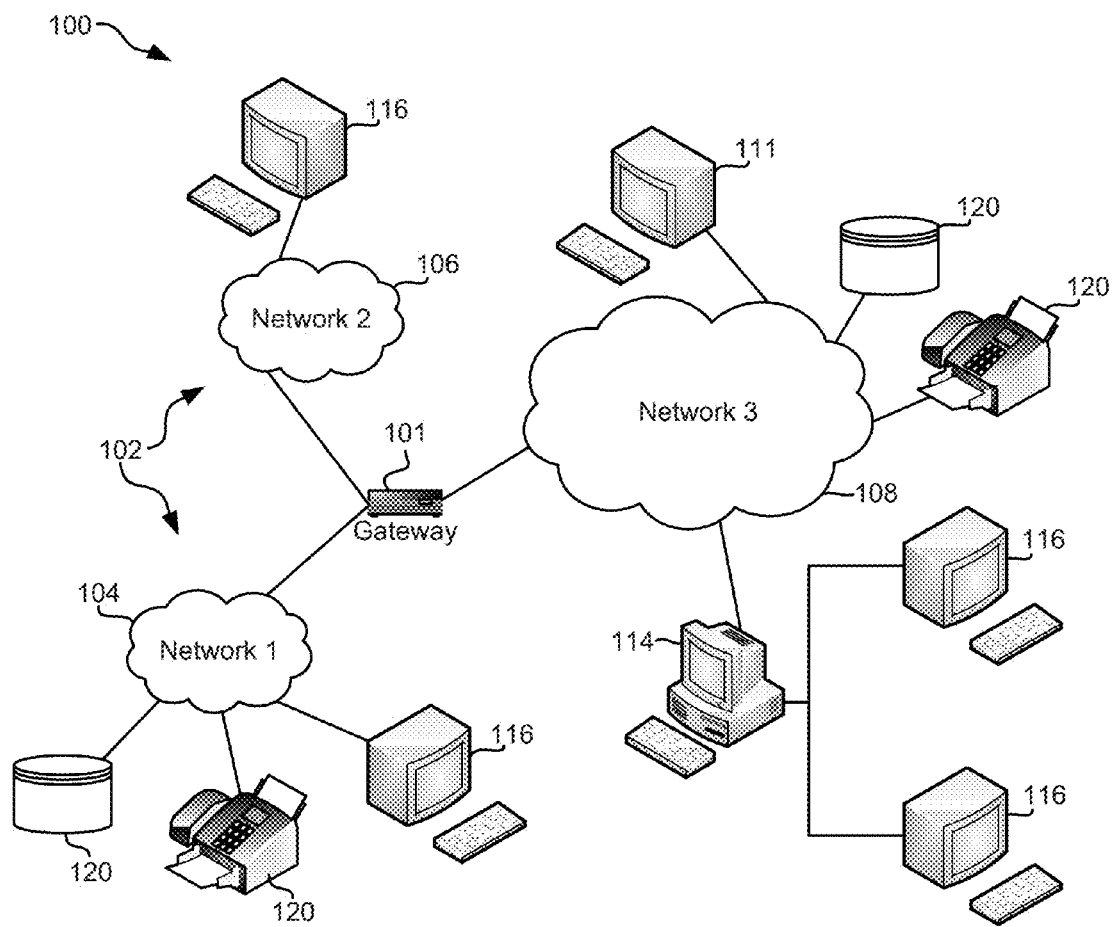
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for autonomic configuration of storage system virtualization, particularly for SVCs.

In one embodiment, a computer-implemented method for obtaining configuration information for virtualization of a storage system includes: receiving a designation of one or more arrays available to a storage system to which virtualization should be applied; receiving a designation of either an existing volume controller or a new volume controller; in response to receiving the designation of the new volume controller, receiving a designation of a name of the new volume controller; and receiving a confirmation, a negation, or a modification of one or more port identifiers, each port identifier corresponding to one of a plurality of ports on the volume controller to be utilized for virtualization.

In another embodiment, a computer-implemented method for configuring virtualization of a storage system includes: creating a storage pool for each array designated by an administrator for virtualization; creating one or more volumes for each storage pool; creating or selecting a volume controller designated by the administrator for hosting virtualization; identifying one or more ports of the volume controller; and mapping the one or more volumes to the one or more ports of the volume controller.

In yet another embodiment, a computer program product for obtaining configuration information for virtualization of a storage system includes a computer readable storage medium having program instructions embodied therewith. The computer readable storage medium is not a transitory signal per se, the program instructions executable by a computer to cause the computer to perform a method. The method includes: receiving, via the computer, a designation of one or more arrays available to a storage system to which virtualization should be applied; receiving, via the computer, a designation of either an existing volume controller or a new volume controller; in response to receiving a designation of the new volume controller, receiving a designation, via the computer, of a name of the new volume controller; and receiving, via the computer, a confirmation, a negation, or a modification of one or more port identifiers, each port identifier corresponding to one of a plurality of ports on the volume controller to be utilized for virtualization.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
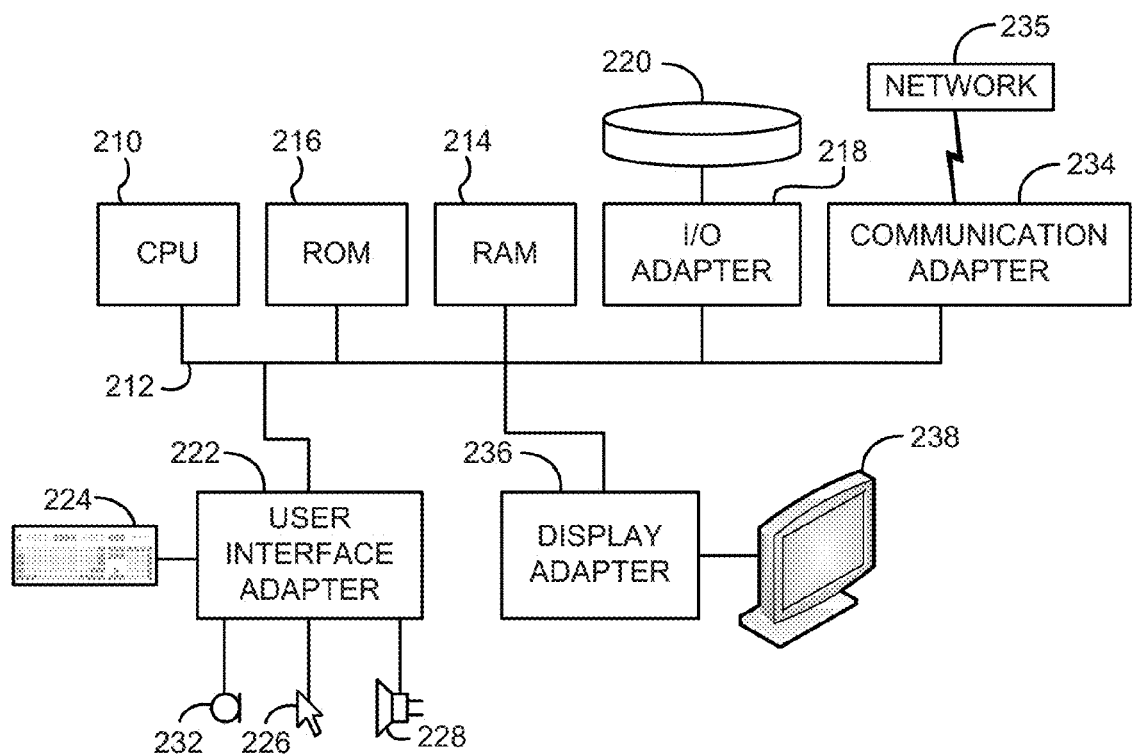
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
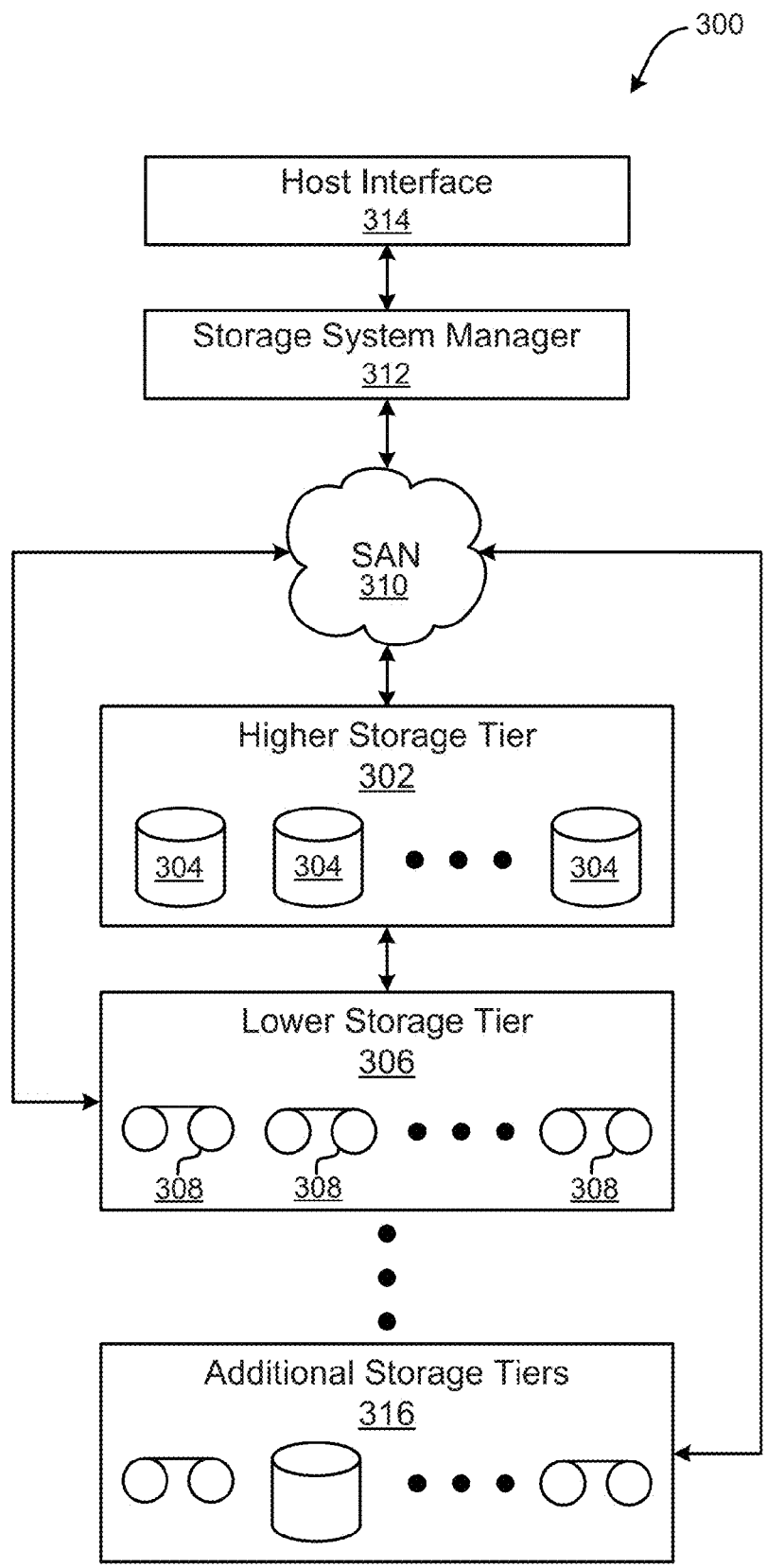
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

As set forth above, storage system configuration for virtualization is a complex process that conventionally is carried out by a human administrator, and therefore the process is prone to introduction of errors. Common errors are particularly in the form of incorrect calculations/estimations regarding capacity of various arrays in the storage system and/or improper configuration of ports, hosts, volumes, arrays, etc. as described above and as would be understood by a person having ordinary skill in the art upon reading the present disclosures.

In addition, administrators configuring storage systems according to the conventional approach may improperly or inefficiently assign storage resources of different types (e.g. resources having different performance characteristics such as tape-based storage, HDD-based storage, SSD-based storage, etc.) to the same storage pool, and/or improperly arrange arrays across different tiers of a tiered storage system such as described above with reference to FIG. 3. The improper and/or inefficient organization of various resources (e.g. arranged in arrays) across the storage system introduces additional inefficiency to the performance, operation, and management of the storage system.

In particular, a storage system controller (distinct from the storage virtualization controller) may typically consume significant processing resources and compute time to manage storage of an inefficiently virtualized storage system, and may do so in a manner that conflicts management tasks performed by the virtualization controller.

Moreover, inefficient assignment of resources throughout the storage system often generates additional input/output (I/O) that would not be necessary for a properly configured virtualized storage system. Administrators performing conventional configuration are often not aware of, or incapable of determining, how to configure the storage system in a manner that minimizes I/O, and thus often cannot avoid the disadvantageous increase in storage system overhead by using the conventional configuration approach.

As will be appreciated by skilled artisans, these errors are detrimental to the functional performance of the storage system, and accordingly there is a need for an improved configuration process to improve the functioning of storage systems.

The presently disclosed inventive concepts include an autonomic configuration process for storage system virtualization. Various embodiments described herein are set forth in the context of an exemplary storage system including a storage area network (SAN) and storage volume controller (SVC) serving the SAN. Of course, other types of storage systems may benefit from use of an autonomic configuration process for storage system virtualization, and the exemplary embodiments described herein are not to be construed as limiting on the scope of the applicability of the instant disclosures to other types of storage systems, as would be understood by a person having ordinary skill in the art upon reading the present descriptions.

Similarly, an exemplary configuration process is set forth herein according to illustrative descriptions in the context of a SAN and SVC. The configuration process includes various operations, facilitated by various tools, which are particularly useful in the context of a SAN and SVC. However, the exemplary process set forth herein may include additional and/or alternative operations which would be understood as being equivalent to the exemplary embodiments set forth herein by a person having ordinary skill in the art, without departing from the scope of the present disclosures. For instance, any storage system employing a virtualization controller, preferably an independent, embedded virtualization controller, may be used in conjunction with the presently disclosed inventive concepts.

Accordingly, in one approach configuration of a storage system may include obtaining system-wide information regarding a desired configuration for the storage system as a whole, rather than requiring the administrator configuring the system to individually provide configuration information for each component (e.g. array) of the storage system.

For example, in one approach system-wide configuration information may include a number and type of various storage resources available to the storage system, such as a number of arrays of each of a plurality of different types of storage devices available to the storage system. Exemplary storage device types may include flash storage, SSD-based storage, HDD-based storage (preferably including high-speed HDD such as 7,200 rpm, 10,000 rpm, and/or 15,000 rpm HDDs), tape-based storage, etc. as would be understood by a person having ordinary skill in the art upon reading the present descriptions.

Preferably different types of storage devices are arranged in a tiered storage system, and system-wide configuration information may include the organization of the tiers of the tiered storage system, in more embodiments. Where a tiered storage system in employed, system-wide configuration information may also include a designation of which entity or entities of the storage system will be responsible for managing data in tiered storage. For instance, a storage system controller and a storage volume controller may be appropriate entities to manage tiered storage. In preferred embodiments, the storage volume controller is the exclusive entity designated to manage data in tiered storage.

System-wide configuration information may also include a user's designation of which portions of a storage system to virtualize, e.g. by selecting a number of arrays of various different storage device types available to the storage system, which should be included in the virtualization process. In one particular approach, the configuration process may include a default setting instructing virtualization of all storage resources available to the storage system.

In still more embodiments, system-wide configuration information may include a designation of a volume controller host to employ in the virtualization process. The volume controller host may be created anew, such that the administrator designates a new volume controller host be created, or alternatively a volume controller host may be designated from among a list of preexisting volume controller hosts. In the event an administrator designates a new volume controller host be created, system-wide configuration information may also include a name of the host resource that will represent the volume controller. Preferably, the name of the host resource is obtained from the administrator, but of course default or predetermined names may be employed, in various embodiments.

Preexisting volume controller hosts may advantageously be employed in future configurations, e.g. to add new storage to a virtualized storage system, in preferred embodiments. Preferably, adding new storage may be accomplished using the configuration process described herein, and includes designating an existing storage volume controller to which the added storage devices should be virtualized.

System-wide configuration information may also include designation of one or more ports on the volume controller that are connected to the storage system. Ports may be designated using any suitable identifier that would be understood by a person having ordinary skill in the art upon reading the present descriptions. Preferably, the port identifiers uniquely identify the port within the storage system, and more preferably each port identifier is a unique identifier.

For instance, in a particularly preferred approach where Fibre Channel ports are employed, port identifiers may include world-wide port names (WWPNs) for each port on the volume controller and which is available to the volume controller. Where SCSI connections are employed, port identifiers may include a unique address of the device to which the port is serving as a connection.

Preferably, certain system-wide configuration information may be determined automatically by the system and/or in the course of the configuration process, e.g. based on detecting the components accessible to the storage system. In a particularly preferred embodiment, the number and type of various storage resources available to the storage system, and the number of arrays of each of a plurality of different types of storage devices available to the storage system are automatically determined based on detecting presence and type of the various devices connected to the storage system. In addition, presence of a volume controller, particularly an embedded volume controller, may be determined automatically, as well as ports on the volume controller that are connected to the storage system, in preferred embodiments.

In embodiments where system-wide configuration information is predetermined, or determined automatically as described above, the administrator preferably is provided the ability to confirm, negate, or modify the predetermined or automatically determined configuration information. In one approach, the administrator may be presented a graphical user interface (GUI) such as described below, and may confirm predetermined or automatically determined configuration information actively (e.g. by interacting with a confirm indicator such as a "check mark") or passively (e.g. by not making changes to the predetermined or automatically determined value).

In particularly preferred approaches, the foregoing exemplary system-wide configuration information is all information necessary to completely configure the storage system for vitalization.

In one embodiment, system-wide configuration information includes automatically determined configuration information and information obtained from an administrator. The automatically determined configuration information includes the type of various storage devices accessible to the storage system, the number of arrays available to each type of storage, the name of any pre-existing (e.g. previously created) volume controllers, and the unique port identifiers of ports on the volume controller(s) which are accessible to the storage system. The configuration information obtained from the user includes a number of arrays to virtualize for each type of storage, and a name of a newly-created volume controller, if a new volume controller was designated.

In particularly preferred approaches, the configuration information necessary to complete virtualization of the storage system consists of the type of various storage devices accessible to the storage system, the number of arrays available to each type of storage, the name of any pre-existing (e.g. previously created) volume controllers, and the unique port identifiers of ports on the volume controller(s) which are accessible to the storage system, a number of arrays to virtualize for each type of storage, and a name of a newly-created volume controller, if a new volume controller was designated.

Accordingly, the presently disclosed inventive configuration systems and techniques represent a significant simplification of the conventional configuration process. Conventionally, the administrator would have to manually create each storage pool each array. The administrator would also need to manually create one or more volumes in each pool. The administrator would have to manually create a host. The administrator would need to manually add each host port to the host. The administrator would have to map each one volume to that host. The administrator would also have to manually adjust storage system controller tier volumes to encryption.

By utilizing the presently disclosed configuration, however, the administrator simply need designate a number of arrays of each type of storage to virtualize, and a host to which the arrays should be virtualized, and the remainder of the configuration process may be automated based on the administrator's designation, optionally in conjunction with predetermined and/or automatically determined configuration information.

Using the predetermined, automatically determined, and/or administrator-provided configuration information, the configuration system configures the storage system for virtualization, in various embodiments. Preferably, configuration includes pool configuration, volume configuration, and host configuration.

Pool configuration may involve creating a single storage pool for each array subject to virtualization, in one approach.

Volume configuration may include creating a single volume for each storage pool, or creating a number of volumes sufficient to provide a total storage capacity of the array the volumes are assigned to. Preferably, where multiple volumes are created for a single pool, each volume provides an equal amount of storage capacity, and the volumes collectively provide a total storage capacity of the array. In one approach, arrays are preferably configured to have a total storage capacity of approximately 16 tebibytes (TiB).

Host configuration, in one embodiment, may include mapping all volumes to a single volume controller host (i.e. the host designated via the configuration information).

In addition, during the configuration process a progress indicator is preferably displayed to indicate that configuration is ongoing, and how much progress has been made in the configuration process. A progress indicator is useful to inform the administrator that configuration is ongoing, so the administrator can ensure actions which may interfere with configuration (e.g. interrupting the process, the storage network connections or power, etc.) may be avoided.

Preferably, according to embodiments of the presently disclosed inventive concepts, some or all of the configuration information may be obtained via a graphical user interface (GUI) such as a wizard configured to guide an administrator through a system-wide configuration process. The GUI, in one exemplary embodiment, includes a welcome screen, an array configuration screen, a volume controller configuration screen, and a summary screen. Of course, other presentations may be employed without departing from the scope of the present disclosure, and in various embodiments the exemplary screens set forth above may include one or more sub-screens. Each screen is preferably configured to present and/or obtain configuration information, information about the configuration process (e.g. steps involved, progress, etc.), etc. via the administrative user performing configuration.

The welcome screen, in one embodiment, may indicate to the administrator the basic outline of the configuration process, and the actions that will be taken using configuration information provided by the administrator. Preferably, the welcome screen indicates to the user that configuration will include automatically virtualizing arrays and storage pools, volumes that will be accessible to the volume controller, configuring the host and host ports identifying the volume controller, and volume mappings for the host.

The array configuration screen preferably displays each type of storage (e.g. flash, SSD, HDD, etc. as described above) and a number of arrays of each type of storage available for virtualization. The array configuration screen is also preferably configured to receive administrator input regarding a number of the arrays to include in the virtualization process.

The volume controller configurations screen is preferably configured to receive administrator input designating one or more of a new virtualization controller host to be created for virtualization, or an existing virtualization controller host to utilize for virtualization. Preferably, the virtualization controller is also configured to receive administrator input designating a virtualization controller host name, particularly in embodiments where a new virtualization controller host is designated.

The volume controller configuration screen, in more embodiments, is configured to receive administrator input confirming, negating, modifying, and/or designating one or more port identifiers for ports on the volume controller available/connected to the storage system.

The summary screen, in one embodiment, is configured to display the configuration information determined and/or obtained from the administrator, as set forth above. In addition, the summary screen may be configured to receive administrator input finalizing the process of obtaining configuration information, and instructing the system to initiate the configuration and virtualization process according to the determined and/or obtained configuration information.

Figure 4:
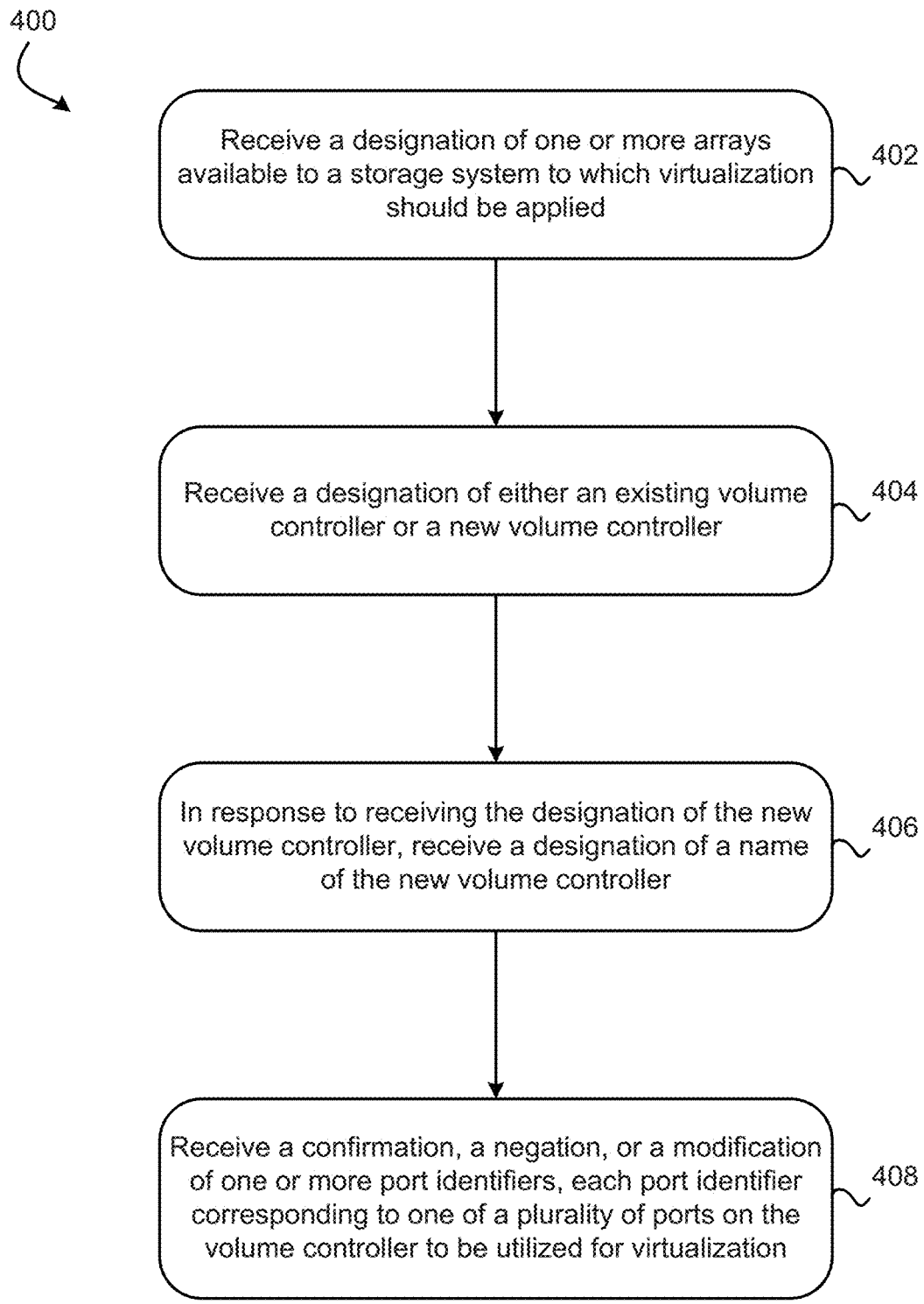
FIG. 4 is a flowchart of a method, according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a human administrator operating a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a designation of one or more arrays available to a storage system to which virtualization should be applied is received.

Method 400 also includes receiving a designation of either an existing volume controller or a new volume controller in operation 404.

In operation 406, method 400 involves, in response to receiving the designation of the new volume controller, receiving a designation of a name of the new volume controller. Preferably, if the designation is of an existing volume controller, the name of the existing volume controller is automatically determined.

Method 400 further involves operation 408, in which a confirmation, a negation, or a modification of one or more port identifiers is received. Each port identifier corresponds to one of a plurality of ports on the volume controller to be utilized for virtualization, and preferably includes a unique identifier.

Optionally, but preferably, the designations, and the confirmation, the negation or the modification are received via a graphical user interface from a human administrator.

Of course, the method 400 may include any number of additional and/or alternative features as described herein, in various embodiments. For instance, in multiple approaches method 400 may include automatically determining configuration information.

In one embodiment, method 400 may include one or more of: automatically detecting one or more different types of storage device available to the storage system; automatically detecting a number of the one or more arrays assigned to each of one or more different types of storage device available to the storage system; automatically detecting the existing volume controller and a name of the existing volume controller before receiving the designation of either the existing volume controller or the new volume controller; and/or automatically detecting the one or more port identifiers before receiving the confirmation, the negation, or the modification.

The method 400 optionally includes displaying a summary of the determined, and/or obtained configuration information. For instance, an exemplary summary may display one or more of: different types of storage device available to the storage system; a number of arrays assigned to each of the different types of storage device; a number of pools assigned to each of the different types of storage device; a number of volumes assigned to each of the different types of storage device; the designated one or more arrays available to a storage system to which virtualization should be applied; the designated existing volume controller or new volume controller; and/or a number of the ports on the volume controller to be utilized for virtualization, in one embodiment.

In another embodiment, and in response to receiving a confirmation of the summary, the method may include initiating a virtualization configuration process. The virtualization configuration process is preferably based at least in part on the received designations and the received confirmation, negation or modification. The virtualization process may also be based at least in part on automatically and/or predetermined information, in various embodiments.

The method 400 may include displaying a progress indicator indicating a progress of the virtualization configuration process, in more embodiments.

Figure 5:
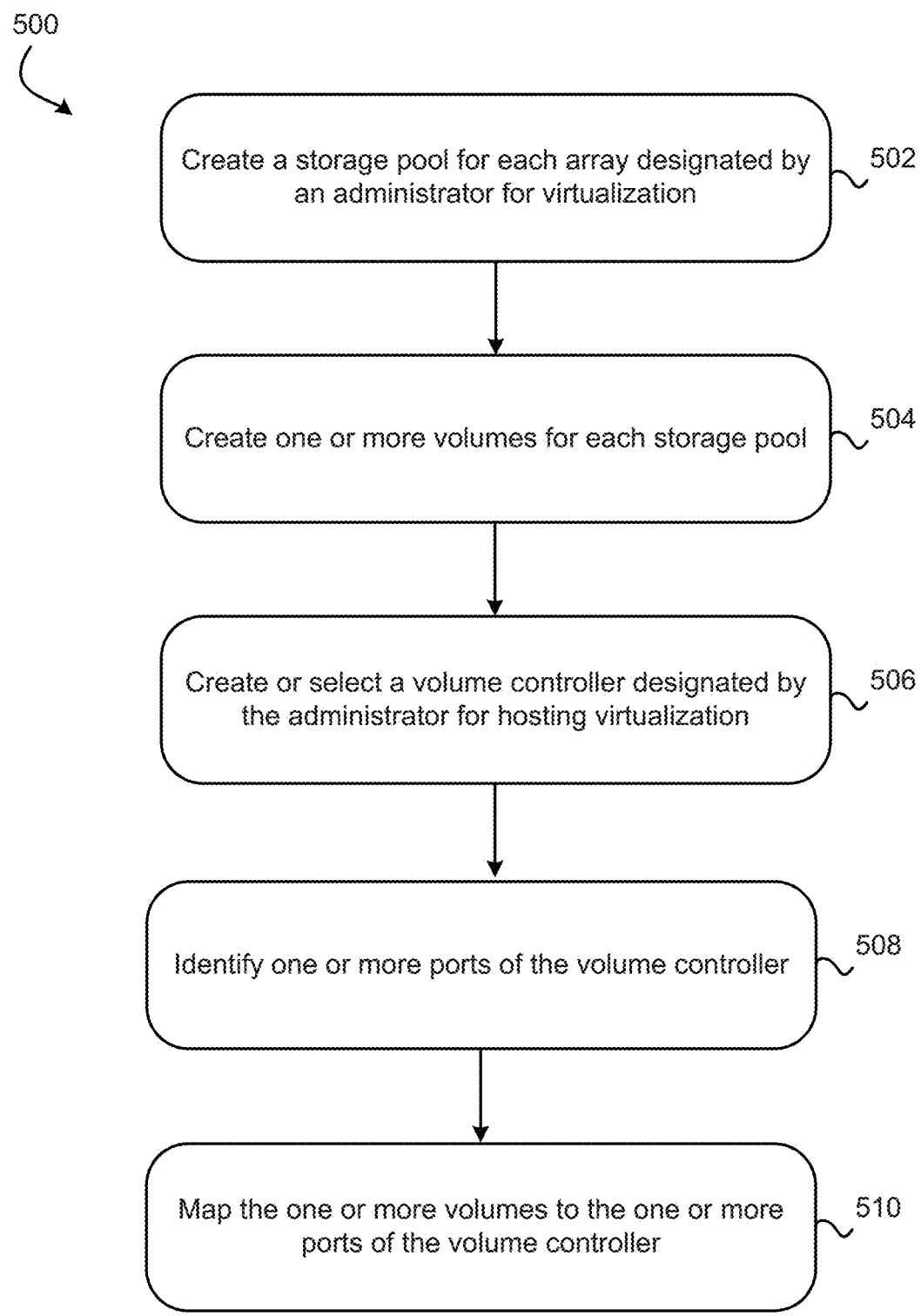
FIG. 5 is a flowchart of a method, according to one embodiment.

Now referring to FIG. 5, a flowchart of a method 500 for configuring virtualization of a storage system is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a human administrator operating a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a storage pool is created for each array designated by an administrator for virtualization.

Further, in operation 504, method 500 includes creating one or more volumes for each storage pool.

Method 500 also includes creating or selecting a volume controller designated by the administrator for hosting virtualization, in operation 506.

Operation 508 of method 500 involves identifying one or more ports of the volume controller.

In addition, according to operation 510 method 500 includes mapping the one or more volumes to the one or more ports of the volume controller.

Of course, in various embodiments method 500 may include any number of additional and/or alternative features, operations, functions, etc. as disclosed herein. For example, in one embodiment method 500 may include determining whether a total storage capacity of each of one or more of the storage pools is greater than a maximum volume storage capacity.

In another embodiment, and preferably in response to determining the total storage capacity of one of the storage pools is greater than the maximum volume storage capacity, method 500 may include: calculating a number of the one or more volumes necessary to provide the total storage capacity of the one of the storage pools; and calculating a storage capacity contribution for each of the volumes. More preferably, a sum of the storage capacity contribution for each of the volumes is a value greater than or equal to the total storage capacity of the one of the storage pools. Most preferably, the storage capacity contribution for each of the volumes is approximately equal.

Conversely, in response to determining the total storage capacity of one or more of the storage pools is not greater than the maximum volume storage capacity, method 500 may include: creating a single of the one or more volumes for each of the one or more storage pools.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for obtaining configuration information for virtualization of a storage system, the method comprising:
   receiving a designation of one or more arrays available to a storage system to which virtualization should be applied;
   receiving a designation of either an existing volume controller host entity or a new volume controller host entity, wherein the designated one of the existing volume controller host entity or the new volume controller host entity is an entity within the storage system that is separate from a plurality of storage devices in the one or more arrays and responsible for managing data across the plurality of storage devices;
   in response to receiving the designation of the new volume controller host entity, receiving a designation of:
      a name of the new volume controller host entity; and
      a name of a host resource that represents the new volume controller host entity; and
   receiving a confirmation, a negation, or a modification of one or more port identifiers, each port identifier corresponding to one of a plurality of ports on the designated volume controller host entity, wherein the designated volume controller host entity is to be utilized for virtualization;
   wherein the designation of the one or more arrays comprises a designation of a number of the one or more arrays to which the virtualization should be applied; and
   wherein the only designated configuration information necessary to configure the virtualization is the designated number of arrays and the designated volume controller host entity.

2. The computer implemented method as recited in claim 1, wherein the designated one of the existing volume controller host entity or the new volume controller host entity is a physical entity; and
   wherein the designated one of the existing volume controller host entity or the new volume controller host entity is the sole entity responsible for managing data across the plurality of storage devices.

3. The computer-implemented method as recited in claim 1, comprising automatically detecting:
   one or more different types of the plurality of storage devices;
   a number of the one or more arrays assigned to each of one or more different types of storage device available to the storage system; and
   the existing volume controller and a name of the existing volume controller before receiving the designation of either the existing volume controller host entity or the new volume controller host entity.

4. The computer-implemented method as recited in claim 1, wherein the designation of the one or more arrays comprises a designation of a number of the one or more arrays to which the virtualization should be applied;
   wherein the configuration information necessary to configure the virtualization consists of:
      a type of each of the storage devices accessible to the storage system;
      a number of the one or more arrays available to each type of storage device;
      the number of the one or more arrays to which the virtualization should be applied;
      the name of either the new volume controller host entity or a name of the existing volume controller host entity; and
      port identifiers of one or more ports on either the new volume controller host entity or the existing volume controller host entity which are accessible by the storage system.

5. The computer-implemented method as recited in claim 1, comprising detecting the one or more port identifiers before receiving the confirmation, the negation, or the modification.

6. The computer-implemented method as recited in claim 1, comprising displaying a summary of:
   one or more different types of storage device available to the storage system;
   a number of arrays assigned to each of the different types of storage device;
   a number of pools assigned to each of the different types of storage device;
   a number of volumes assigned to each of the different types of storage device;
   the designated one or more arrays available to the storage system to which virtualization should be applied;
   the designated volume controller host entity; and
   a number of the ports on the designated volume controller host entity;
   in response to receiving a confirmation of the summary:
      initiating a virtualization configuration process, wherein the virtualization configuration process is based on the received designations and the received confirmation, negation or modification; and
      displaying a progress indicator indicating a progress of the virtualization configuration process.

7. The computer-implemented method as recited in claim 1, wherein the storage system to which virtualization should be applied comprises a storage area network (SAN);
   wherein the designated volume controller host entity is a storage volume controller (SVC) serving the SAN; and
   wherein the SVC is designated exclusively to manage data in the SAN.

8. The computer-implemented method as recited in claim 7, wherein the storage system is a tiered storage system, and wherein the SVC is the exclusive entity configured to manage the tiered storage system.

9. The computer-implemented method as recited in claim 1, wherein the plurality of ports on the designated volume controller host entity comprise one or more Fibre Channel (FC) ports; and
   wherein the one or more port identifiers comprise worldwide port names (WWPNs).

10. The computer-implemented method as recited in claim 1, comprising initiating a virtualization configuration process in response to receiving the designations and the received confirmation, negation or modification, wherein the virtualization configuration process comprises:
   pool configuration, wherein pool configuration comprises creating a single storage pool for each array subject to virtualization;
   volume configuration, wherein volume configuration comprises either:
      creating a single volume for each storage pool, or
      creating a number of volumes sufficient to provide a total storage capacity of the one or more arrays to which one or more volumes are assigned; and host configuration, wherein host configuration comprises mapping all volumes of the storage system to the designated volume controller host entity.

11. The computer-implemented method as recited in claim 1, comprising:
   detecting the one or more port identifiers before receiving the confirmation, the negation, or the modification;
   displaying a summary of:
      one or more different types of storage device available to the storage system;
      a number of arrays assigned to each of the different types of storage device;
      a number of pools assigned to each of the different types of storage device;
      a number of volumes assigned to each of the different types of storage device;
      the designated one or more arrays available to the storage system to which virtualization should be applied;
      the designated volume controller host entity; and
      a number of the ports on the designated volume controller host entity;
   in response to receiving a confirmation of the summary:
      initiating a virtualization configuration process, wherein the virtualization configuration process is based on the received designations and the received confirmation, negation or modification; and
      displaying a progress indicator indicating a progress of the virtualization configuration process;
   wherein the storage system to which virtualization should be applied comprises a storage area network (SAN); and
   wherein the designated volume controller host entity is a storage volume controller (SVC) serving the SAN.

12. The computer-implemented method as recited in claim 1, comprising:
   automatically detecting:
      one or more different types of the plurality of storage devices;
      a number of the one or more arrays assigned to each of one or more different types of storage device available to the storage system; and
      the existing volume controller host entity and a name of the existing volume controller host entity before receiving the designation of either the existing volume controller host entity or the new volume controller host entity; and
   detecting the one or more port identifiers before receiving the confirmation, the negation, or the modification;
   displaying a summary of:
      one or more different types of storage device available to the storage system;
      a number of arrays assigned to each of the different types of storage device;
      a number of pools assigned to each of the different types of storage device;
      a number of volumes assigned to each of the different types of storage device;
      the designated one or more arrays available to the storage system to which virtualization should be applied;
      the designated volume controller host entity; and
      a number of the ports on the designated volume controller host entity;
   in response to receiving a confirmation of the summary:
      initiating a virtualization configuration process, wherein the virtualization configuration process is based on the received designations and the received confirmation, negation or modification; and
      displaying a progress indicator indicating a progress of the virtualization configuration process; and
   wherein the designated one of the existing volume controller host entity or the new volume controller host entity is a physical entity;
   wherein the storage system to which virtualization should be applied comprises a storage area network (SAN);
   wherein the designated volume controller host entity is a storage volume controller (SVC) serving the SAN;
   wherein the SVC is designated exclusively to manage data in the SAN;
   wherein the storage system is a tiered storage system;
   wherein the SVC is the exclusive entity configured to manage the tiered storage system;
   wherein the plurality of ports on the designated volume controller host entity comprise one or more Fibre Channel (FC) ports; and
   wherein the one or more port identifiers comprise world-wide port names (WWPNs).

13. A computer-implemented method for configuring virtualization of a storage system, the method comprising:
   receiving, from an administrator, a designation of one or more arrays available to a storage system to which virtualization should be applied;
   creating a storage pool for each designated array;
   creating one or more volumes for each storage pool;
   receiving, from the administrator, a designation of either an existing volume controller host entity or a new volume controller host entity, wherein the designated one of the existing volume controller host entity or the new volume controller host entity is a separate entity within the storage system responsible for managing data across one or more different types of storage device available to the storage system;
   in response to receiving the designation of the new volume controller host entity, receiving a designation of:
      a name of the new volume controller host entity; and
      a name of a host resource that represents the new volume controller host entity;
   creating or selecting either the existing volume controller host entity or the new volume controller host entity based on the designation received from the administrator;
   identifying one or more ports of the created or selected volume controller host entity;
   receiving a confirmation, a negation, or a modification of one or more port identifiers, each port identifier corresponding to one of the identified ports; and
   mapping the one or more volumes to the one or more identified ports of the created or selected volume controller host entity;
   wherein the designation of the one or more arrays comprises a designation of a number of the one or more arrays to which the virtualization should be applied; and
   wherein the only designated configuration information necessary to configure the virtualization is the designated number of arrays and the designated volume controller host entity.

14. The computer-implemented method as recited in claim 13, comprising:
   determining whether a total storage capacity of each of one or more of the storage pools is greater than a maximum volume storage capacity;

in response to determining the total storage capacity of one of the storage pools is greater than the maximum volume storage capacity:
  calculating a number of the one or more volumes necessary to provide the total storage capacity of the one of the storage pools; and
  calculating a storage capacity contribution for each of the volumes, wherein a sum of the storage capacity contribution for each of the volumes is a value greater than or equal to the total storage capacity of the one of the storage pools; and
in response to determining the total storage capacity of one or more of the storage pools is not greater than the maximum volume storage capacity: creating a single of the one or more volumes for each of the one or more storage pools; and
wherein the storage capacity contribution for each of the volumes is approximately equal.

15. A computer program product for obtaining configuration information for virtualization of a storage system, the computer program product comprising a computer readable storage medium having program instructions embodied therewith, wherein the computer readable storage medium is not a transitory signal per se, the program instructions executable by a computer to cause the computer to perform a method comprising:
  receiving, via the computer, a designation of one or more arrays available to a storage system to which virtualization should be applied;
  receiving, via the computer, a designation of either an existing volume controller host entity or a new volume controller host entity, wherein the designated one of the existing volume controller host entity or the new volume controller host entity is a physical entity within the storage system that is separate from each of a plurality of storage devices in the one or more arrays, and responsible for managing data across the plurality of storage devices;
  in response to receiving a designation of the new volume controller host entity, receiving a designation, via the computer, of:
    a name of the new volume controller; and
    a name of a host resource that represents the new volume controller host entity; and
  receiving, via the computer, a confirmation, a negation, or a modification of one or more port identifiers, each port identifier corresponding to one of a plurality of ports on the designated volume controller host entity, wherein the designated volume controller host entity is to be utilized for virtualization;
  wherein the designation of the one or more arrays comprises a designation of a number of the one or more arrays to which the virtualization should be applied; and
  wherein the only designated configuration information necessary to configure the virtualization is the designated number of arrays and the designated volume controller host entity.

16. The computer program product as recited in claim 15, comprising program instructions executable by the computer to cause the computer to automatically detect:
  one or more different types of storage device available to the storage system; and
  a number of the one or more arrays assigned to each of one or more different types of storage device available to the storage system.

17. The computer program product as recited in claim 15, wherein the designation of the one or more arrays comprises a designation of a number of the one or more arrays to which the virtualization should be applied;
  wherein the configuration information necessary to configure the virtualization consists of:
    a type of each of the storage devices accessible to the storage system;
    the number of the one or more arrays to which the virtualization should be applied;
    the name of either the new volume controller host entity or a name of the existing volume controller host entity; and
    port identifiers of one or more ports on either the new volume controller host entity or the existing volume controller host entity which are accessible by the storage system.

18. The computer program product as recited in claim 15, comprising program instructions executable by the computer to cause the computer to automatically detect:
  the existing volume controller and a name of the existing volume controller before receiving the designation of either the existing volume controller or the new volume controller; and
  the one or more port identifiers before receiving the confirmation, the negation, or the modification.

19. The computer program product as recited in claim 15, comprising program instructions executable by the computer to cause the computer to detect the one or more port identifiers before receiving the confirmation, the negation, or the modification.

\* \* \* \* \*